United States Patent [19]

Agerley et al.

[11] Patent Number: 4,586,464
[45] Date of Patent: May 6, 1986

[54] ANIMAL-DRINKING VALVE

[76] Inventors: Jorgen Agerley, Kirkebjerg 9 Grongroft, DK-6200 Abenra, Denmark; Konrad Werner, Am Wohld 28, 2301 Felm, Fed. Rep. of Germany

[21] Appl. No.: 675,988

[22] Filed: Nov. 29, 1984

[30] Foreign Application Priority Data

Dec. 2, 1983 [DK] Denmark .......................... 5551/83
Nov. 2, 1984 [DE] Fed. Rep. of Germany ... 8404184[U]

[51] Int. Cl.⁴ ............................................. A01K 7/00
[52] U.S. Cl. ................................... 119/72.5; 119/75
[58] Field of Search ............................. 119/72.5, 75

[56] References Cited

U.S. PATENT DOCUMENTS

| | | | |
|---|---|---|---|
| 2,851,007 | 9/1958 | Kagan | 119/72.5 |
| 3,602,197 | 8/1971 | Fioretto | 119/72.5 |
| 4,187,804 | 2/1980 | von Taschitzki | 119/72.5 |
| 4,284,036 | 8/1981 | Hostetler | 119/72.5 |

Primary Examiner—Hugh R. Chamblee
Attorney, Agent, or Firm—Murray Schaffer

[57] ABSTRACT

A cylindrically hollow housing has an inlet at its upper end and an outlet at the lower end. A valve seat having a primary bore extending axially through its center is located in the housing dividing it into an upper and a lower chamber communicating through the primary bore. A ball is freely located in the upper chamber and an operating lever extends axially through the outlet opening. The lever has a flanged head closing the outlet. The lever is resiliently biased in a first position wherein the head closes the outlet and is movable into a second position wherein the outlet is open for the passage of fluid. The valve is arranged so that when the lever is in the first position the primary bore is open for fluid flow and when the lever is in the second position the ball occludes the primary bore.

7 Claims, 6 Drawing Figures

ANIMAL-DRINKING VALVE

This invention relates to an animal drinking valve and in particular to an animal drinking valve for metering a predetermined amount of fluid.

Animal drinking valves are known as, for example, from U.S. Pat. No. 4,284,038. In this valve the fluid, e.g. water flows so long as the operating lever is pressed down by the animal. Therefore, in this device it cannot be determined for certain how much water is actually taken in by the animal.

The present invention is based on the problem of constructing an animal drinking valve by which the outflowing amount of water from each actuation of the opearing lever is limited to only a predetermined amount of water.

According to the present invention the animal drinking valve comprises a cylindrically hollow housing having an inlet at its upper end and an outlet at the lower end, and a valve seat having a primary bore extending axially through its center dividing said housing into an upper and a lower chamber communicating through said primary bore. A ball is freely located in said upper chamber and an operating lever extends axially through the outlet opening. A flanged head is attached to the inner end of the lever abutting the outlet opening. The lever is resiliently biased in a first position wherein the head closes the outlet and is movable into a second position by the animal wherein the outlet is open for the passage of fluid. The valve is disposed so that when the lever is in the first position the primary bore is open for fluid flow and when the lever is in the second position the ball occludes the primary bore.

Preferably the valve seat is formed with a secondary bore radially offset from the central primary bore extending axially parallel thereto in communication with each of the upper and lower chambers. The valve is disposed at a downward angle so that when the lever is in the first position the ball occludes the secondary bore and when the lever is in the second position the ball is free of the secondary bore.

Further features and advantages of this invention can be deducted from the description, which includes an operating example of this animal drinking valve, fully described and explained with the aid of drawings. The drawings show:

Figure 1A:
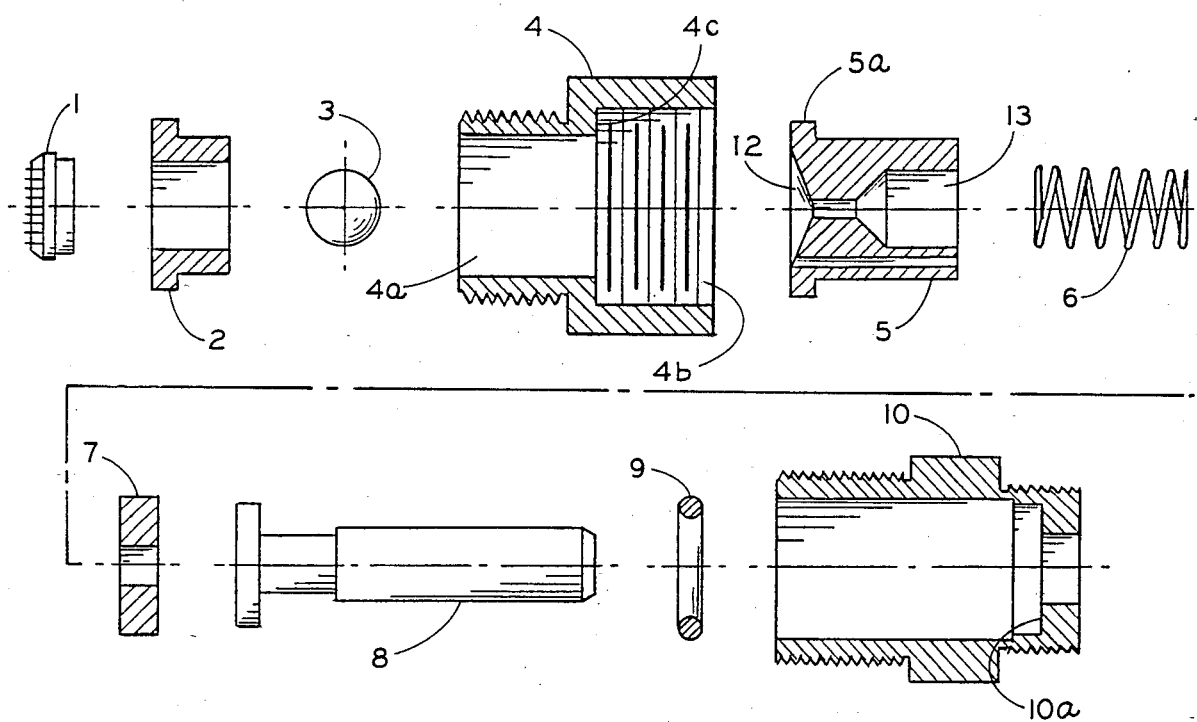
FIG. 1 is an exploded view of the components of the animal drinking valve of the present invention.
FIG. 1b is a sectional view through the valve of the present invention illustrating the assembly of the parts shown in FIG. 1.
Figure 1B:
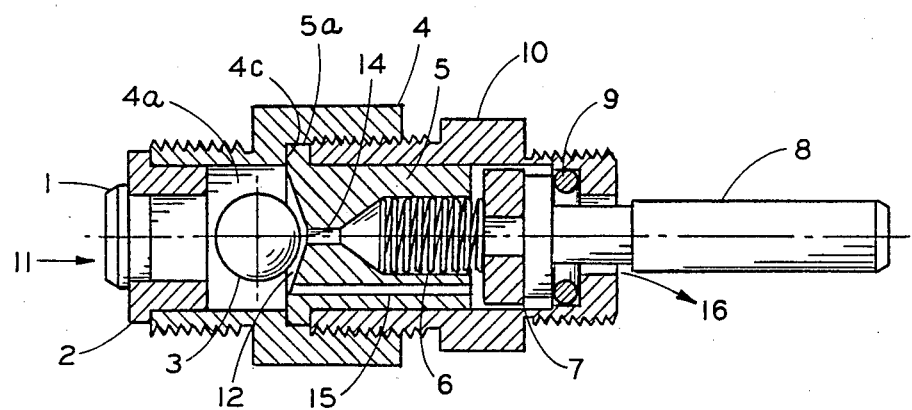

The different operational components of the valve of the present invention are seen in FIG. 1 and their assembly illustrated in FIG. 1b. They consist of a filter 1; a filter holder 2 into which the filter 1 sits and which forms an inlet 11 from a source of water; a steel ball 3; an upper housing element 4, having a two step hollow interior defining an upper chamber 4a in which the ball 3 is located and a lower chamber 4b separated therefrom by a shoulder 4c; a valve seat 5 adapted to fit within the chamber 4b with a radial flange 5a abutting the shoulder 4c, the valve seat 5 further having a conically convex upper face 12 on which the ball 3 is adapted to roll, a chamber 13 for expansion of the flow of water, a central bore 14 forming a primary fluid line communicating between the face 12 and chamber 13, and an auxiliary or secondary bore 15 smaller in diameter than the primary bore 14 located radially eccentric from the central bore 14 and extending fully from the face 12 to its opposite lower end; a spring 6 adapted to fit in the expansion chamber 13, an annular washer 7 abutting the spring 6 and spaced from the lower end of the valve seat to leave a space allowing communication between the secondary bore 15 and the chamber 13; an operating lever 8 having a flat radially enlarged head 17 adpated to abut the lower surface of the annular washer 7; an elastic seal ring 9; and, a lower housing element 10 having a shoulder 10a against which the seal ring 9 abuts and through the central opening 16 of which the lever 8 passes, the lower housing element 10 being adapted to encompass the valve seat 5 and to be telescopingly threaded into the upper housing element 4, to fix securely the valve seat 5 against the shoulder 4c.

Figure 2:
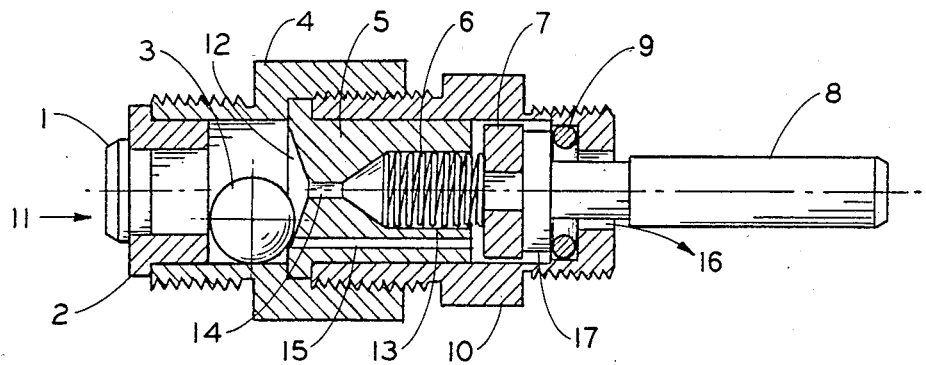
FIG. 2 is a longitudinal sectional view of the animal drinking valve of the present invention in the closed position.
Figure 3:
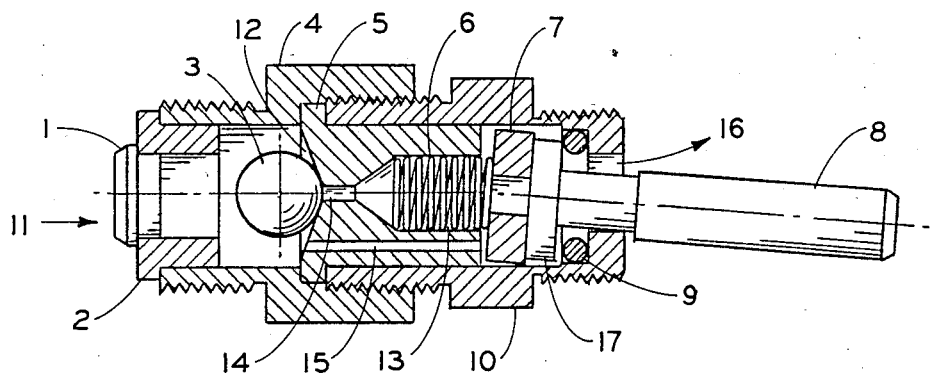
FIG. 3 is a view similar to FIG. 2 showing the operating lever depressed.

FIGS. 2 and 3 show the function and method of operation of the valve. The valve is installed by attaching the inlet 11 to the end of a pipe, hose, or other outlet from a source of fluid such as running water so that the valve is disposed at a downward angle to the horizontal as seen in the figures. As long as the operating lever is not despressed, the free moving ball 3 situated in the upper chamber 4a between the water inlet 11 and the face 12 of the valve seat 5 normally lays in front of the eccentrically positioned secondary line 15 Main line flow from the inlet 11 through the upper chamber 4a, the central bore 14 and the second chamber 13 into the space 5d between the lower end of the valve seat 5, the annular washer and out of the outlet 16 is blocked because the head 17 of the lever is pressed tightly against the seal ring 9, as a result of both the pressure of the fluid and pressure of the spring 6.

When the operating lever 8 is pressed down (out of the axial direction) into the position as shown in FIG. 3, the head 17 is removed from the seal ring 9 and the passageway from the inlet 11 to the outlet 16 is momentarily opened, because the ball 3 remains for a moment in the position as shown in FIG. 2, and free flow is possible from the inlet. The pressure drop caused by the flow of fluid through the expansion chamber 4a causes a shifting of the ball 3 into the center of the cone shaped face 12. Consequently the steel ball 3 blocks the flow through the main line 14 from the inlet 11 to the outlet 16.

The line 15 which was opened after the shifting of the position of the ball 3 to the center is now nevertheless blocked, because the operating lever 8 when depressed, as shown in FIG. 3 tilts the annular washer 7 upward into contact with the lower end of the secondary bore 15. The amount of fluid flow from each actuation of the operating lever through the valve is, therefore, limited by the closing of the bores 14 and 15 at their respective opposite ends, having allowed only the momentary flow of fluid.

The ball 3 remains in the center position as shown in FIG. 3 until the operating lever 8 is released again. At the moment of release the annular washer 7 is removed from and reopens the lower opening of the secondary bore 15, which causes fluid flow into the lower chamber 13 from the inlet 11 through the upper chamber 4a and the secondary bore 15. Gravity and fluid flow, through the secondary line 15 into the lower chamber 13 only, causes a shifting of the ball 3 out of the center of the cone shaped face 12 back to the position as shown in FIG. 2. The feeding cycle may then be repeated.

The present drinking valve possesses two blocking elements to shut off the water flow; the ball 3 and the flanged lever head 17. A tilting of the head 17 from the seal ring 9 automatically causes, after a short time, a shifting of the ball 3 in such a manner that the ball 3 blocks the fluid flow through the main bore 14, which being of larger diameter enables a rapid feeding of the fluid to the animal. After the release of the operating lever 8 the passage of fluid between head 17 and seal ring 9 is again blocked, causing build-up of water in chamber 13 by fluid flow through bore 15. The ball 3 is then caused to move opening the way between the inlet 11 and the chamber 13 and at the same time blocking the secondary line 15.

Through the selection of the downward angle to the horizontal, in which the valve is mounted, the amount of water which is able to flow out after each actuation of the operating lever 8 may be regulated. The greater the downward angle to the horizontal, the smaller is the respective out-flowing amount of water, because the ball 3 will block the primary bore 14 sooner after the actuation of the operating lever 8.

Figure 4:
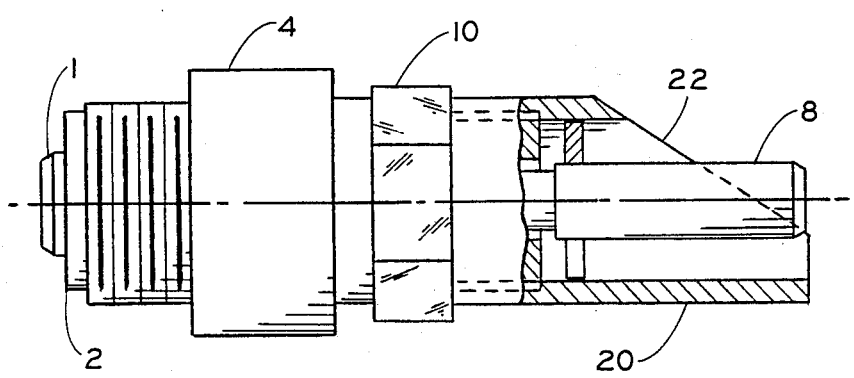
FIG. 4 is an elevational view of the animal drinking valve with an added endpiece, partially in a cut view.
Figure 5:
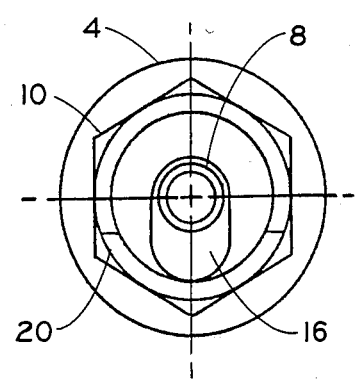
FIG. 5 is an end view taken in the direction of arrow IV of FIG. 4.

By shrouding the lever 8 in an oral extension 20 of the lower housing element 10, as seen in FIG. 4 and truncating the extension to have an angular wall 22 the direction of depression can be assured to operate the lever head 17 in the predetermined direction to cause tilting of the annular washer 7 to properly cover the secondary line 15.

We claim:

1. An animal drinking valve comprising a cylindrically hollow housing having an inlet at its upper end and an outlet at the lower end, a valve seat having a primary bore extending axially through its center, said valve seat being located in said housing and dividing said housing into an upper and a lower chamber communicating through said primary bore, a ball freely located in said upper chamber and an operating lever extending axially through said outlet opening having a flanged head abutting said outlet opening in said lower chamber, said lever being resiliently biased in a first position wherein said head closes said outlet and is movable into a second position wherein said outlet is open for the passage of fluid, said valve being disposed so that when said lever is in said first position said primary bore is open for fluid flow and when said lever is in said second position said ball occludes said primary bore.

2. The valve according to claim 1, wherein said valve seat is formed with a secondary bore radially offset from the central bore and extending axially parallel thereto in communication with each of said upper and lower chambers, said valve being disposed at a downward angle so that when said lever is in said first position said ball occludes said secondary bore and when said lever is in said second position said ball is free of said secondary bore.

3. The valve according to claim 2, wherein said valve seat has a conically concave upper face on which said ball is adapted to roll, and an enlarged chamber below said primary bore for the expansion of fluid passing therethrough.

4. The valve according to claim 2, including an elastic seal ring interposed between said head of the lever and the outlet.

5. The valve according to claim 2, wherein the diameter of the primary bore is greater than the diameter of the secondary bore.

6. The valve according to claim 2, including an annular washer mounted on the head of said lever for abutment against the lower end of said secondary bore when said lever is in the second position.

7. The valve according to claim 6, including spring means interposed between said valve seat and said annular washer to bias said lever axially outward of said outlet.

* * * * *